United States Patent
Choi et al.

(10) Patent No.: US 8,156,475 B2
(45) Date of Patent: Apr. 10, 2012

(54) DEVICE AND METHOD FOR TESTING EMBEDDED SOFTWARE USING EMULATOR

(75) Inventors: Byoung-Ju Choi, Gangnam-gu (KR);
Joo-Young Seo, Songpa-gu (KR);
Ah-Young Sung, Bucheon-si (KR);
Kwang-Hyun La, Anyang-si (KR);
Sung-Bong Kang, Seocho-gu (KR);
Ki-Cheol Lee, Hwaseong-si (KR);
Yong-Hun Kim, Songpa-gu (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 1114 days.

(21) Appl. No.: 12/018,347

(22) Filed: Jan. 23, 2008

(65) Prior Publication Data
US 2008/0270840 A1   Oct. 30, 2008

(30) Foreign Application Priority Data
Apr. 25, 2007   (KR) .................. 10-2007-0040128

(51) Int. Cl.
*G06F 9/44* (2006.01)
(52) U.S. Cl. .................................................. 717/124
(58) Field of Classification Search ........... 717/124–126
See application file for complete search history.

(56) References Cited

U.S. PATENT DOCUMENTS

| 5,500,941 A | 3/1996 | Gil |
| 5,715,387 A | 2/1998 | Barnstijn et al. |
| 7,020,867 B2 * | 3/2006 | Underseth et al. ............ 717/106 |
| 7,047,176 B2 | 5/2006 | Klevans et al. |
| 7,216,340 B1 * | 5/2007 | Vinodkrishnan et al. ...... 717/127 |
| 7,426,717 B1 * | 9/2008 | Schang et al. ................ 717/124 |
| 7,478,281 B2 * | 1/2009 | Denniston ...................... 714/31 |
| 7,496,791 B2 * | 2/2009 | Tillmann et al. ............... 714/25 |
| 7,925,659 B2 * | 4/2011 | Wefers et al. ................. 707/756 |
| 2005/0094567 A1 * | 5/2005 | Kannan et al. ................. 370/241 |
| 2007/0016829 A1 | 1/2007 | Subramanian et al. |

FOREIGN PATENT DOCUMENTS

| KR | 1020030000794 A | 1/2003 |
| KR | 1020030053675 A | 7/2003 |
| KR | 1020040087767 A | 10/2004 |
| KR | 1020070035570 A | 3/2007 |

* cited by examiner

*Primary Examiner* — Anna Deng
(74) *Attorney, Agent, or Firm* — Volentine & Whitt, PLLC

(57) ABSTRACT

Embodiments of the invention provide a device and a method for automatically testing embedded software, and more specifically for testing interfaces between layers of the embedded software. In one embodiment, the device includes: an emulator; a server including embedded software; an evaluation board configured to download the embedded software from the server and controlled by the emulator; and a host system configured to receive the embedded software from the server and automatically generate test cases for testing the embedded software using the emulator.

16 Claims, 5 Drawing Sheets

DEVICE AND METHOD FOR TESTING EMBEDDED SOFTWARE USING EMULATOR

CROSS-REFERENCE TO RELATED APPLICATIONS

This U.S. non-provisional patent application claims priority under 35 U.S.C. §119 of Korean Patent Application No. 10-2007-0040128, filed on Apr. 25, 2007, the entire contents of which are hereby incorporated by reference.

BACKGROUND OF THE INVENTION

1. Field of the Invention

The present invention disclosed herein relates to an embedded software test, and more particularly but without limitation, to a device and a method for automatically testing interlayer interfaces of the embedded software.

2. Description of the Related Art

A typical tool for testing embedded software is a debugger equipped with a part of integrated development environment. Other test tools are limited to analyzing the performance of embedded software.

A debugger generally provides functions such as break points, symbol monitoring, and stack monitoring. For example, Microsoft's Visual Studio .NET software development tool can set a break point at any point in a code listing, monitor and change global and local variables, and read and modify memory regions in code and data sections. However, these debugging functions are performed in an ad-hoc manner according to the personal experience and expertise of a software engineer or other tool users. A more objective and systematic approach is needed.

A typical test tool for analyzing embedded software performance generally provides functions such as memory usage analysis, and execution path analysis. For instance, IBM's "Rational Test RealTime" and Metrowerks' "CodeTEST" use software analysis functions within the framework of a system test after regarding the embedded software as a single functional unit. However, embedded software performance is closely related to the interaction between software and hardware components such as between an operating system (OS) and device drivers. For this reason, integration tests between such components are very important, and a method for supporting such integration testing is needed.

SUMMARY OF THE INVENTION

The invention provides a device and method for automatically testing interlayer interfaces in embedded software.

An embodiment of the invention provides a method for testing embedded software including: downloading the embedded software; analyzing the embedded software to identify an interlayer interface in the embedded software; associating the identified interlayer interface with one of a plurality of predetermined interface types; and generating test cases for the identified interlayer interface based at least in part on the one of the plurality of predetermined interface types.

Another embodiment of the invention provides a processor-readable storage medium, the processor-readable storage medium having stored thereon processor-executable code, the processor-executable code adapted to perform the foregoing method when executed by the processor.

BRIEF DESCRIPTION OF THE FIGURES

The accompanying figures are included to provide a further understanding of the present invention, and are incorporated in and constitute a part of this specification. The drawings illustrate exemplary embodiments of the present invention and, together with the description, serve to explain principles of the present invention. In the figures.

DETAILED DESCRIPTION OF PREFERRED EMBODIMENTS

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Embodiments of the invention disclosed herein relate to a method for automatically testing embedded software in an emulator environment.

Figure 1:
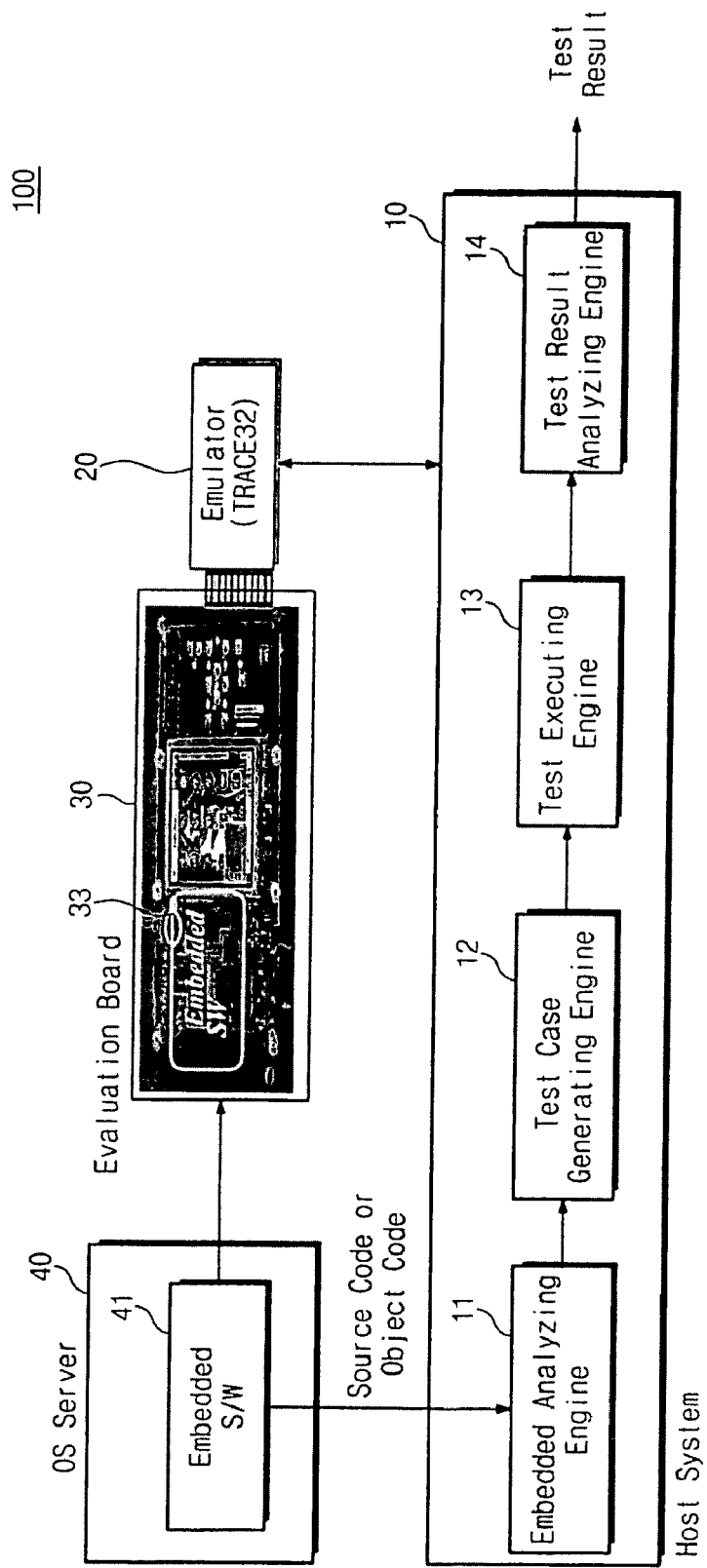
FIG. 1 is a block diagram of a test system according to an embodiment of the present invention.

FIG. 1 is a block diagram of a test system 100 according to an embodiment of the present invention.

Referring to FIG. 1, the test system 100 includes a host system 10, an emulator 20, an evaluation board 30, and an OS server 40.

The host system 10 generates test cases for testing an embedded software interface. The emulator 20 executes the test case generated from the host system 10, and then outputs the result. The evaluation board 30 is provided to test the embedded software 41 in hardware. The OS server 40 includes the embedded software 41, and loads the embedded software 41 into the evaluation board 30 under the control of the emulator 20.

The host system 10 includes an embedded software analyzing engine 11, a test case generating engine 12, a test executing engine 13, and a test result analyzing engine 14. The embedded software analyzing engine 11 receives source code or object code of the embedded software 41 from the OS server 40. The embedded software analyzing engine 11 automatically identifies the specific location from an executable linker format (ELF) file; each of the locations represents where each interface symbol corresponding to each interface of the embedded software 41 is mapped in the source code or the object code. The test case generating engine 12 generates test cases for testing the embedded software 41. The test case is written in a script language, which can be executed on the evaluation board. The test executing engine 13 provides the test case from the test case generating engine 12 to the emulator 20, and controls the emulator 20 for execution. The test result analyzing engine 14 receives a test result from the emulator 20, and analyzes the received test result. The test result analyzing engine 14 reports an analysis of the test result. The analysis may include, for instance, a summary of test coverage, fault information, and performance data.

Figure 2:
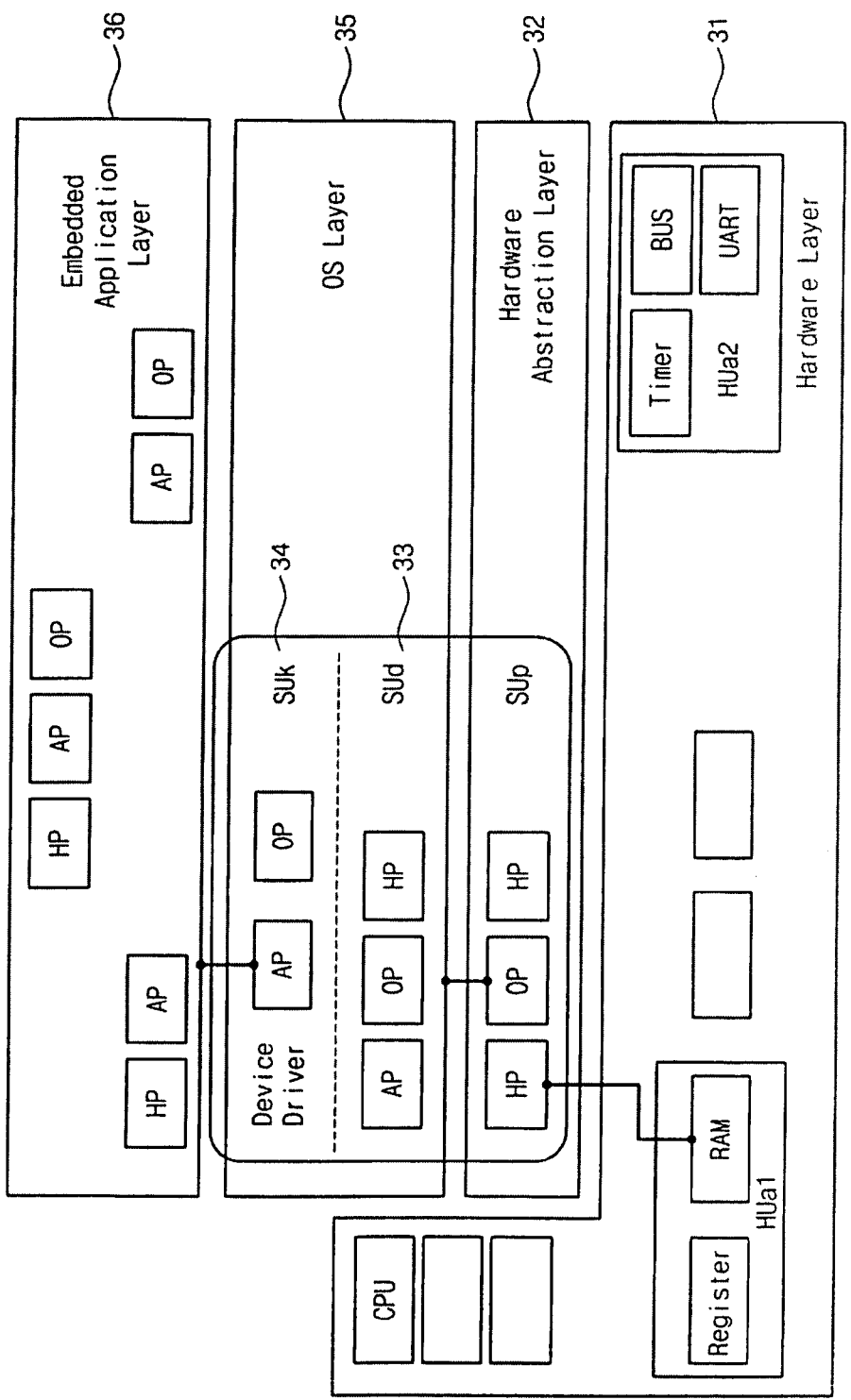
FIG. 2 is a block diagram of an interface of an embedded system according to an embodiment of the present invention.

FIG. 2 is a block diagram of an interface of an embedded system according to an embodiment of the present invention.

Referring to FIG. 2, the embedded system includes a hardware layer 31, a hardware abstraction layer (HAL) 32, an operating system (OS) layer 35, and an application layer 36. The OS layer 35 includes embedded software 33 and kernel software 34. As shown, device drivers are connected to the OS layer 35 and the HAL 32, and are embodied in software units.

The embedded software 33 includes software units (SU's) in multiple layers, which are organically connected to each other. The software units in each layer are divided into kernel-dependent software unit (SUk), device-dependent software unit (SUd), and processor-dependent software unit (SUp) types. The SUk depends on kernel software, and is an OS service like an application program interface (API). The SUd is software for supporting a physical device such as a LCD controller. The SUp is HAL software for hardware device initialization and configuration, and depends on a target processor.

FIG. 2 also illustrates hardware units HUa1 and HUa2 included in hardware layer 31. HUa1 is associated with a register and Random Access Memory (RAM); HUa2 is associated with a timer, a bus, or a Universal Asynchronous Receiver/Transmitter (UART).

Figure 3:
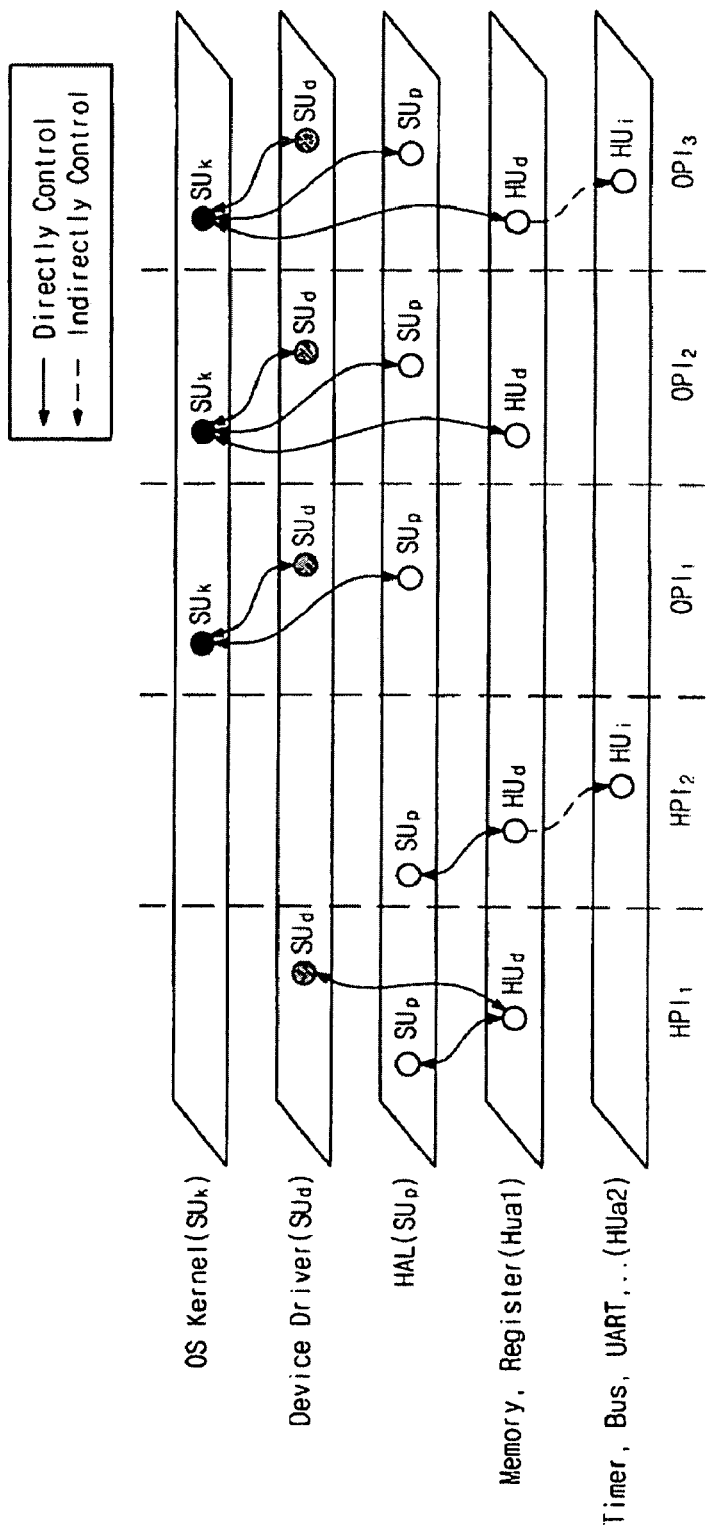
FIG. 3 is an illustration of interfaces between components in FIG. 2.

FIG. 3 is an illustration of interfaces between components in FIG. 2.

Referring to FIG. 3, an interface associated with a hardware unit (HU) that can be directly or indirectly accessed from embedded software is defined as a hardware part interface (HPI). An interface with respect to an OS part is called an OS part interface (OPI). In total, FIG. 3 illustrates five types of interfaces.

First, a hardware part interface HPI1 exists when a software unit such as SUd or SUp directly accesses a hardware unit HUa1 (such as RAM capable of reading/writing data).

Second, a hardware part interface HPI2 exists when a software unit such as SUp indirectly controls a hardware unit HUa2 (such as a timer) through an address of a HUa1 register.

Third, an OS part interface OPI1 exists when the SUd and SUp call functions of SUk that are not related to the control of hardware unit. In this instance, the called functions of SUk could include, for example, task management, inter-task communication, system calls related to an exceptional handling, and certain API functions.

Fourth, an OS part interface OPI2 exists when the SUd and SUp call functions of SUk that are directly related to a hardware unit HUa1. In this case, the called functions of SUk could include system calls for managing a virtual memory.

Fifth, an OS part interface OPI3 exists when the SUd and SUp call functions of SUk that is indirectly related to a hardware unit (e.g., where a HUa2 is indirectly controlled through a HUa1). The called functions of SUk may relate, for example, to physical memory management, time management, interrupt handling, IO management, networking.

Each of the five interface types above may be associated with a test interface symbol used to generate the test case, as described below with reference to FIGS. 4A and 4B.

An embodiment of the present invention relates to an automation device and method for testing an embedded software interface. Such automation features are integrated into an emulator that includes basic debugging and performance monitoring functions necessary to test embedded software interfaces. An embedded software test automation method of the present invention automatically identifies an interface, generates test cases according to an interface test criteria, and performs a test on embedded software. Moreover, debugging processes such as fault detection and fault cause search are integrated into the test process.

Figure 4A:
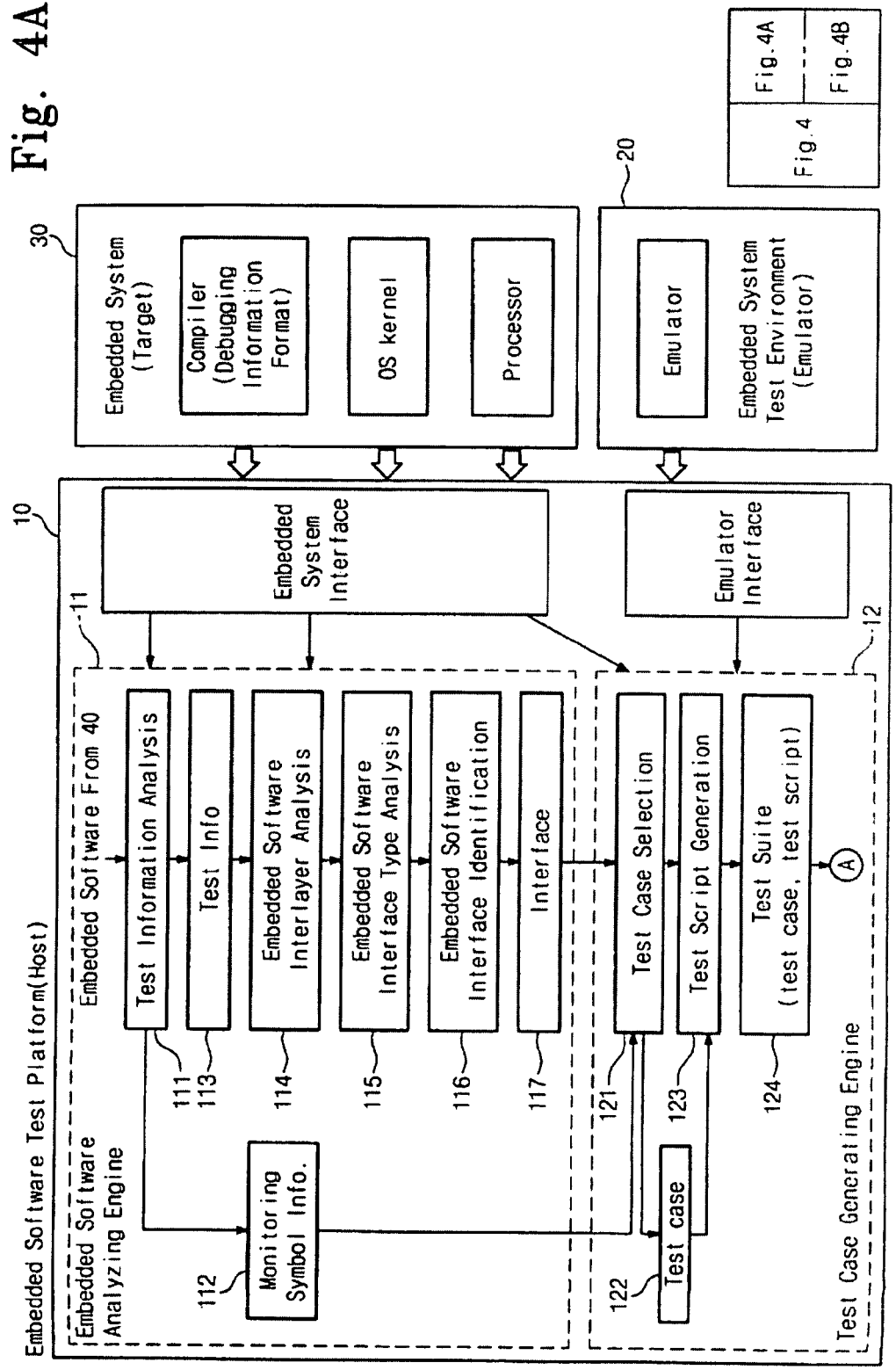
FIGS. 4A and 4B are flowcharts of a test operation order according to an embodiment of the present invention.
Figure 4B:
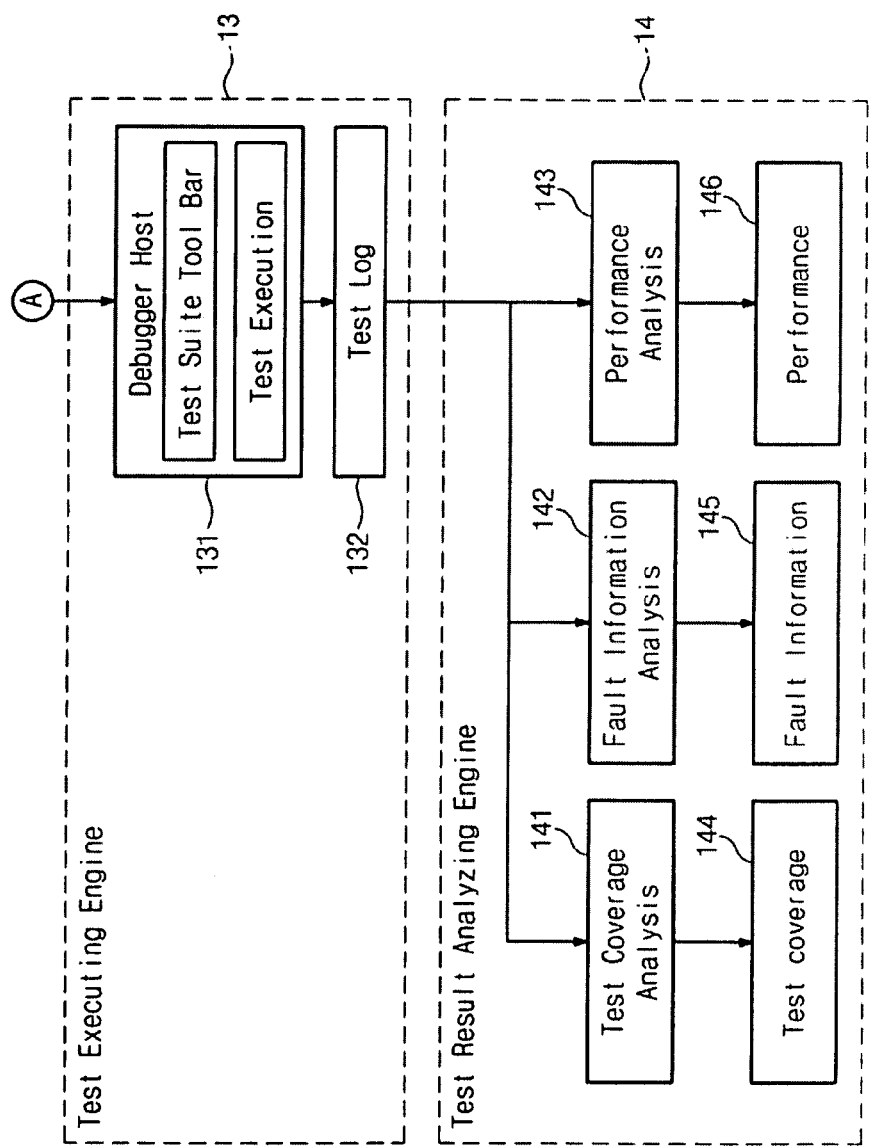

FIGS. 4A and 4B are flowcharts of a test operation order according to an embodiment of the present invention.

Referring to FIGS. 4A and 4B, an embedded software test device 100 of the present invention includes an embedded SW analyzing engine 11, a test case generating engine 12, a test executing engine 13, and a test result analyzing engine 14, all coupled in series. FIGS. 4A and 4B further illustrate processes that are performed by each of the foregoing functional blocks.

The embedded software analyzing engine 11 receives the embedded software 41 from the OS Server 40 in an executable image such as an executable and linking format (ELF). The embedded SW analyzing engine 11 automatically identifies interface locations and debugging information in the embedded software 41 in operation 111. The embedded SW analyzing engine 11 extracts monitoring symbol information from the executable image in operation 112. The monitoring symbol information is determined based on a function-call relationship that can be defined according to interface properties.

The embedded SW analyzing engine 11 extracts caller and callee information associated with each function in the embedded software 40 in operation 113.

In operation 114, the embedded SW analyzing engine 11 identifies functions in each embedded software layer. For example, the embedded software layer is automatically identified as a SUk function in an OS kernel layer in the case of OS system calls and OS API functions. A function that includes a device driver name is automatically identified as a SUd of the device driver layer. Moreover, a function that includes a processor name is automatically identified as a SUp of the HAL layer.

The embedded SW analyzing engine 11 then extracts an interface type according to a function-call relationship between the embedded software layers in operation 115. Operation 115 may be based on the interface type definitions illustrated in FIG. 3. For example, a function-call relationship between a SUd and a HUa1 that is related to RAM, or a function-call relationship between SUp and HUa1 that is related to RAM is automatically extracted as an HPI1 interface type. On the other hand, a function-call relationship between SUp and HUa1 that is related to a special register is automatically extracted as an HPI2 interface type.

The embedded SW analyzing engine 11 identifies the interface in operation 116, and finally determines an interface in operation 117.

Referring to FIG. 4A, the test case generating engine 12 automatically generates a test case at each identified interface based on the extracted monitoring symbol information in operation 121. Then, in operation 122, the test case generating engine 12 generates a test case that includes pass/fail criteria for the function associated with the monitoring symbol. Each pass/fail criteria may include a set of input data and expected output data. For example, parameters and return values of a function corresponding to an embedded software interface may be limited to registers R0, R1, R2, and R3 according to standard procedure call protocol that is disclosed in a hardware processor specification (and thus may be automatically determined).

In operation 123, the test case generating engine 12 converts the test case into a test script for automatically executing the test case in the emulator 20. The test script includes a script command determining pass/fail of the test result and a script command storing the test result as a log for analyzing the test result. The test script may further include a script commands for stopping at predetermined interface locations in the embedded code, a script command for executing a test target automatically, and a script command monitoring actual output values for comparison to expected output values associated with a pass/fail standard.

The test case generating engine 12 automatically generates test suite in operation 124. A test suite is a set of test cases according to an interface coverage. Each test case in the test suite is written in script language for automatically executing in an emulator such that the emulator 20. Equipped with debugging and monitoring functions. Each test case includes a symbol that will be monitored in a corresponding interface, together with input data and expected output data.

The process for testing embedded software is continued in FIG. 4B. The test executing engine 13 associates a test suite with a graphical user interface (GUI) feature, such as a button on a test suite tool bar; upon activation of the GUI feature, the test executing engine 13 executes the selected test suite for a target embedded software by using the emulator 20 in operation 131. Other GUI features could alternatively be used in operation 131, according to design choice.

In operation 132, the test executing engine 13 stores the test results as a test log.

In operation 141, the test result analyzing engine 14 distinguishes a tested interface from an untested interface based on pass/fail information in the test log. The total interface test coverage can then be determined in operation 144 by comparing the number of tested interfaces to the total number of interfaces that were identified in the embedded software. Embedded software interface tests may be continued until 100% of the identified interfaces have been tested.

The test result analyzing engine 14 analyzes fault locations and causes from the pass/fail information of the test log in operation 142, and summarizes and/or stores such fault information in operation 145.

In operation 143, the test result analyzing engine 14 calculates performance metrics such as maximum, minimum, and average values based on measured performance data in the test log. The test analyzing engine 14 compiles, stores, and/or reports the calculated performance metrics in operation 146.

The process illustrated in FIGS. 4A and 4B, and described above, may be implemented in processor-executable code (software). The processor-executable code may be stored in a processor-readable storage medium, such a random access memory (RAM), read-only memory (ROM), a hard drive, or a compact disc (CD).

The invention provides many benefits. The invention provides a method for testing embedded software in actual hardware, so that target hardware can be emulated before finishing a product. The invention also provides a software test automation device for the above automation method. Advantageously, the invention automatically identifies and tests interfaces between different layers of the embedded software. Moreover, the inventive method and system integrates debugging and monitoring functions of an emulator into a test automation tool so that when faults are detected, a fault cause can be suggested.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method for testing an embedded software comprising:
   receiving the embedded software;
   analyzing the embedded software to identify an interlayer interface in the embedded software, wherein analyzing the embedded software includes identifying a plurality of functions in the embedded software, each of the plurality of functions being associated with one of a plurality of software unit types and a plurality of hardware unit types;
   associating the identified interlayer interface with one of a plurality of predetermined interface types;
   generating a test case for the identified interlayer interface based at least in part on the one of the plurality of predetermined interface types;
   testing the embedded software using the test case to produce a test result; and
   analyzing the test result, wherein analyzing the test result includes distinguishing a tested interface from an untested interface based on pass/fail information in a test log, and comparing a number of tested interfaces to a total number of interfaces identified in the embedded software.

2. The method of claim 1, wherein receiving the embedded software includes receiving the embedded software in an executable image format.

3. The method of claim 1, wherein the plurality of software unit types includes:
   a kernel-dependent software unit (SUk) type;
   a device-dependent software unit (SUd) type; and
   a processor-dependent software unit (SUp) type.

4. The method of claim 3, wherein the plurality of hardware unit types includes:
   a first hardware unit (HUa1) type associated with a register or memory location; and
   a second hardware unit (HUa2) type associated with one of a timer, a bus, and a universal asynchronous receiver/transmitter (UART).

5. The method of claim 4, wherein associating the identified interlayer interface with one of a plurality of predetermined interface types includes associating a first interface type with an interface when a SUd type or SUp type directly accesses a HUa1 type.

6. The method of claim 5, wherein associating the identified interlayer interface with one of a plurality of predetermined interface types includes associating a second interface type when a SUp type indirectly controls a HUa2 type through an address of a HUa1 type register.

7. The method of claim 6, wherein associating the identified interlayer interface with one of a plurality of predetermined interface types includes associating a third interface type when one of a SUd type and an SUp type call a function of a SUk type that is not related to hardware unit control.

8. The method of claim 7, wherein associating the identified interlayer interface with one of a plurality of predetermined interface types includes associating a fourth interface type when one of an SUd type and a SUp type call a function of an SUk type that is directly related to a HUa1 type.

9. The method of claim 8, wherein associating the identified interlayer interface with one of a plurality of predetermined interface types includes associating a fifth interface type when one of a SUd type and a SUp type call a function of an SUk type that is indirectly related to a HUa2 type.

10. The method of claim 1, wherein generating the test case includes generating a test script.

11. The method of claim 10, wherein generating the test script includes:
   generating a first script command for stopping at a predetermined interface location in the embedded code;
   generating a second script command for executing a test target; and
   generating a third script command for monitoring actual output values for later comparison to expected output values associated with a pass/fail criteria.

12. The method of claim 10, wherein generating the test case further includes generating a test suite, the test suite including a plurality of test scripts, each of the plurality of test scripts associated with a corresponding one of a plurality of identified interface layers in the embedded software.

13. The method of claim 1, wherein testing the embedded software includes:
   receiving a selection from a tool bar; and
   storing the test result in a test log.

14. The method of claim 1, wherein analyzing the test result includes analyzing fault locations and causes based on pass/fail information in a test log.

15. The method of claim 1, wherein analyzing the test result includes determining at least one of a maximum value, a minimum value, and an average value based on measured performance data in a test log.

16. A processor-readable storage medium, the processor-readable storage medium having stored thereon processor-executable code, the processor-executable code adapted to perform a method for testing an embedded software when executed by the processor, the method comprising:
   receiving the embedded software;
   analyzing the embedded software to identify an interlayer interface in the embedded software, wherein analyzing the embedded software includes identifying a plurality of functions in the embedded software, each of the plurality of functions being associated with one of a plurality of software unit types and a plurality of hardware unit types;
   associating the identified interlayer interface with one of a plurality of predetermined interface types;
   generating a test case for the identified interlayer interface based at least in part on the one of the plurality of predetermined interface types
   testing the embedded software using the test case to produce a test result; and
   analyzing the test result, wherein analyzing the test result includes distinguishing a tested interface from an untested interface based on pass/fail information in a test log, and comparing a number of tested interfaces to a total number of interfaces identified in the embedded software.

\* \* \* \* \*